United States Patent [19]

Plows et al.

[11] 3,821,488

[45] June 28, 1974

[54] METHOD AND APPARATUS FOR MAKING MASTER RECORDS FOR DISC RECORDS BY SCANNING THERMOPLASTIC FILM WITH ELECTRON BEAM

[75] Inventors: Graham Stuart Plows; Gordon Malcolm Edge, both of London, England

[73] Assignee: Decco Limited, London, England

[22] Filed: Apr. 25, 1972

[21] Appl. No.: 247,443

[30] Foreign Application Priority Data

Apr. 28, 1971 Great Britain .................... 11993/71

[52] U.S. Cl.... 179/100.4 C, 178/6.6 TP, 179/100.1 B

[51] Int. Cl. .......................... G11b 3/00, H04n 5/82

[58] Field of Search ...................... 346/74 TP, 77 E; 179/100.4 C, 100.3 A, 100.3 G, 100.1 B, 100.3 N; 178/6.6 B, 6.6 A, 6.6 TP, 6.9 A, 6.7 R; 340/173 TP, 173 CR; 274/46 R, 46 A

[56] References Cited

UNITED STATES PATENTS

| | | | |
|---|---|---|---|
| 3,120,991 | 2/1964 | Newberry et al. | 178/6.6 TP |
| 3,287,563 | 11/1966 | Clunis | 340/173 TP |
| 3,328,777 | 6/1967 | Hart | 340/173 TP |
| 3,627,916 | 12/1971 | Bestenreiner | 179/100.3 G |
| 3,737,589 | 6/1973 | Redlich et al. | 179/100.3 V |

OTHER PUBLICATIONS

Hart, Thermoplastic Readout System, IBM Tech. Discl. Bull., Vol. 9, No. 9, 2/67, p. 1095.

*Primary Examiner*—Raymond F. Cardillo, Jr.
*Attorney, Agent, or Firm*—Mawhinney & Mawhinney

[57] ABSTRACT

A method of recording television picture signals by scanning a spiral track on a conductively supported disc of thermoplastic material with an electron beam and heating the disc to transform the modulations of the beam into a spatially modulated groove. The beam is oscillated from side to side at a frequency which varies to ensure that charge is laid down at least twice on every point of the track and the beam is blanked at the extremities of its side-to-side movement.

6 Claims, 7 Drawing Figures

METHOD AND APPARATUS FOR MAKING MASTER RECORDS FOR DISC RECORDS BY SCANNING THERMOPLASTIC FILM WITH ELECTRON BEAM

FIELD OF THE INVENTION

This invention relates to recording a signal as variations in a groove in a thermoplastic record member.

BACKGROUND TO THE INVENTION

The present invention is primarily concerned with making a master record which, after suitable processing, can be used in the large scale manufacture of gramophone or video record discs. However, one of the features of a recording made according to the present invention is that it can be played back by means other than a stylus or pressure transducer. This facility is useful in the manufacture of records which are to be played back by means of a stylus or pressure transducer, because it facilitates the checking of a recording before copies of the recording are made.

BRIEF SUMMARY OF THE INVENTION

According to the invention there is provided a method of recording comprising controlling, as a function of a signal to be recorded, an electron beam which is directed at a thin thermoplastic electrically resistive film disposed on a conductive member, relatively moving the beam and the film so that the beam deposits a continuous track of electric charge which varies along the track in accord with the said signal, heating at least the part of the film on which the track is deposited, additionally controlling the impingement of the beam on the film so as to produce a groove which varies along its length according to the said signal, and cooling the film.

Further features of the invention include an apparatus for recording and a method of making gramophone or similar disc records.

BRIEF DESCRIPTION OF THE ACCOMPANYING DRAWINGS

FIG. 1 diagrammatically illustrates a preferred method of recording;

DESCRIPTION OF THE PREFERRED EMBODIMENT

The preferred method by which a recording is made is generally as follows. The recording medium itself consists of a thin film of thermoplastic material disposed on the surface of a conductive member which is preferably a conductive disc. A high density focussed electron beam, which will be called hereinafter an electron probe, impinges on the film. The film is moved relatively with respect to the probe; preferably the relative movement is effected by simultaneous rotation and translation of the disc.

The simultaneous rotation and translation of the disc is appropriate for the formation of a convoluted or spiral track which is appropriate if gramophone or video record discs are to be made from the recording.

Figure 1:
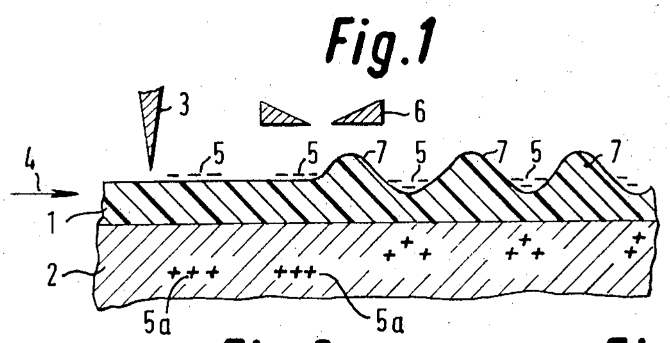

In FIG. 1, which is principally a section along the centre of a track, is shown a thin layer of thermoplastic material 1 disposed on the surface of a conductive disc 2. The electron probe is denoted by the reference 3 and the relative motion between the layer 1 and the probe 3 is illustrated by the arrow 4.

The thickness of the thermoplastic layer 1 is preferably about 8 microns.

The intensity of the electron probe impinging on the layer 1 is varied in accord with an input signal so that the density of the charge 5 varies along the track. Preferably, but not essentially, the intensity of the probe is modulated by a carrier signal that is itself modulated, preferably in frequency, by an information bearing signal.

Where charge is deposited on the track, an excess pressure is exerted on the surface of the layer 1 owing to the force between the deposited charge 5 and the conductive disc. Such a pressure can be conveniently and accurately calculated by the method of images in which there is assumed to be an equal charge 5*a* of opposite sign located below the surface of the conductor at the depth equal to the thickness of the film 1.

If the thermoplastic material is already or is now softened, the pressure due to the charge 5 pulls the surface of the film 1 down until that pressure is balanced by the resultant of the surface tension of the film and the hydrostatic pressure in it. When excess pressure is exerted on a liquid surface the surface becomes concave towards that pressure. Accordingly, in the charged regions of the track the surface of the film 1 is depressed and becomes concave. In the uncharged regions the surface become convex.

Softening of the thermoplastic should not increase to the point where significant horizontal flow, that is to say flow in the plane of the film, occurs and accordingly the average excess downward pressure due to the attraction of the charge to the conductive member must be balanced on the average over the uncharged parts. This balancing occurs as the surface of the film in the uncharged regions rises above the original undisturbed surface plane. In these regions the excess hydrostatic pressure causes the surface of the film to be convex. Thus along the track there are formed ripples corresponding to the variations in intensity of the electron probe.

A means for heating the film 1 is illustrated in FIG. 1 as a radio frequency heater 6. An infra-red heater could be used instead. The ripples formed are denoted by the references 7.

When the thermoplastic film is heated it becomes more conductive and there is a time constant governing the dissipation of the deposited charge. The time constant is governed both by the bulk resistivity of the thermoplastic film and the intrinsic repulsion between the surface charges.

In order to retain the recorded information the thermoplastic film must be cooled in a time long compared with the mechanical time constant of relaxation of the film and short compared with the aforementioned electrical time constant. The latter can be made about one hundred times the former and accordingly the choice of cooling time is not difficult.

Figure 2:
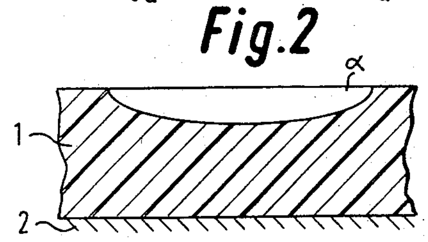
FIGS. 2 and 3 illustrate limits of possible profiles of grooves formed in a thin thermoplastic layer.
Figure 3:
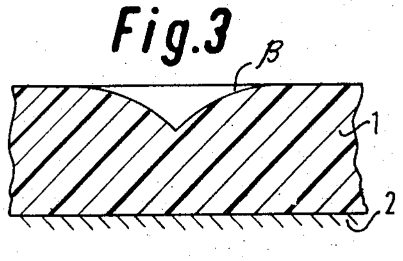

In addition to the relative movement of the electron probe and the thermoplastic film for the purpose of depositing charge along a track, the impingement of the probe on the film must be controlled in order to form a clearly delimited groove. FIG. 2 illustrates the cross-section of a groove which would be formed if a uniformly dense strip of charge is laid along the track. Here the profile $\alpha$, namely the cross-section of the groove, is gently curved. FIG. 3 illustrates the cross-section of the groove which would arise if a theoretical line charge were laid along the track. The profile $\beta$ in FIG. 3 exhibits a well-defined notch from which the sides of the groove slope convexly up to the surface of the film 1. The ideal profile of the groove lies between these two extremes and for the sake of example may be approximately an isosceles triangle of depth 0.5 micron and breadth 7.5 micron with a rounded apex, the radius of curvature being about 1 micron at the apex. In general provided that the charge distribution lies between the two extremes described above, then a triangular profile will be provided for the groove.

It will be readily apparent that it is important that the profile of the groove, away from the border where neighbouring groove modulations interact, should remain constant; that is to say the triangular profile should retain its shape. Moreover the profile of the groove should be invariant with vertical modulation of the depth of the apex of the groove.

An appropriate charge distribution must vary in a sense across the track, and may be produced by varying the area of impingement, by for example oscillating the beam from side to side, across the line of deposition of charge.

Alternatively cylindrical focussing of the electron beam to form an elliptical electron probe may be used to produce a Gaussian charge density distribution.

The thermoplastic film should fulfil several physical requirements. First of all, it should have a high resistivity. Normally a bulk resistivity of more than $10^{11}$ ohm-cm. in the fluid state is appropriate. Second, the thermoplastic should be solid at ordinary temperatures. A softening point between 60°C and 100°C would be preferable. Thirdly, a fairly sharp softening point is necessary. Typically the thermoplastic may be solid up to 65° Celsius but fluid at 85° Celsius. Fourthly, assuming that the thermoplastic film would be disposed in vacuum during recording, the vapour pressure must be below $10^{-2}$ millimetres of mercury and preferably below $10^{-5}$ millimetres of mercury. Fifthly, the viscosity in the softened state should be of the order of 10,000 centistokes. Sixthly, it should be stable in the presence of radiation so that during recording no perceptible radiation damage occurs.

Another requirement which is appropriate in practice is that the thermoplastic should be capable of receiving, for example by an evaporation method, a thin metal layer. Normally in the art of making gramophone records a master is provided with a thin metal layer for the purpose of making, after additional processing, a "mother" recording from which pressings can be made. The thin metal layer deposited on the master may be electroplated and finally the metal 'negative' would be removed from the thermoplastic film. Thus the thermoplastic film should be capable of releasing the metal layer without damage. However the range of possible thermoplastic materials can be extended by the use of a release agent which is sprayed on to the film before it is metallised.

The term 'thermoplastic' is not used herein in a strict sense to connote any specific group of chemical compounds, a variety of substances, including waxes, would be suitable. One thermoplastic material that would be suitable is polystyrene which can be sprayed, painted or spun on to the conductive disc and if necessary partially scraped off to leave a film of suitable thickness.

Figure 4:
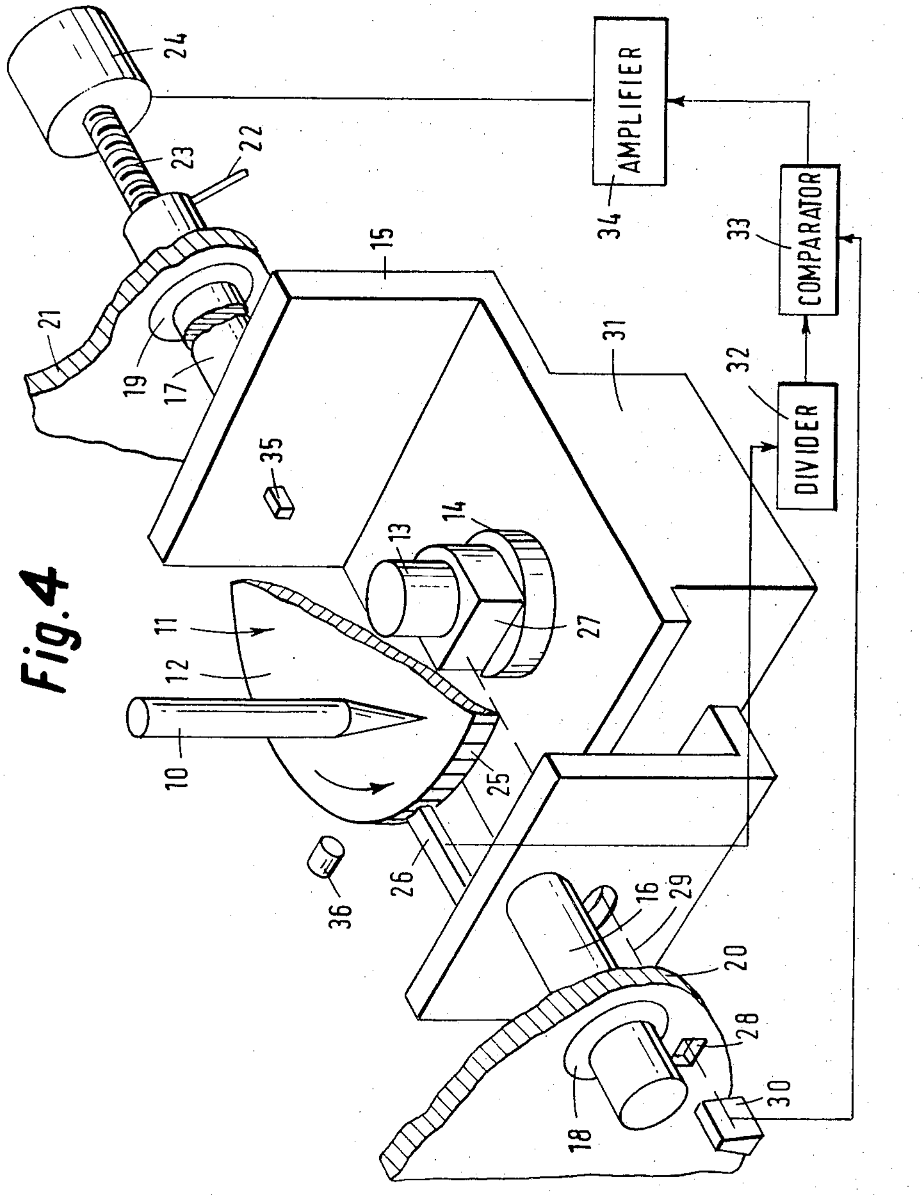
FIG. 4 illustrates the principal parts of an apparatus suitable for recording and playback.

FIG. 4 illustrates an apparatus suitable for recording by the method previously described. An electron probe 10 is directed vertically downwards towards a thin thermoplastic layer 11 carried on a conductive disc 12. The disc is mounted for rotation about its principal axis on a vertical shaft 13 mounted in a bearing 14. The bearing is carried by a carriage 15 which is adapted for horizontal movement at right angles to the axis of the vertical shaft 13. The shaft 13 and bearing 14 may be removable together with the disc. In this embodiment the recording apparatus is wholly disposed within a vacuum chamber. Horizontal shafts 16 and 17 extend from the carriage 15 through sealed bearings 18 and 19 respectively in opposite walls 20 and 21 of the vacuum chamber. The horizontal shafts are aligned along a 'translation' axis through the point where the rotary axis of the disc intersects its upper surface. The carriage can be tilted about the translation axis by means of a tilt lever 22 attached to the shaft 17. Translation of the carriage along the translation axis is provided by means of a lead screw 23 driven by a motor 24.

The disc 12 carries an optical grating 25 which cooperates with an angular position encoder 26 to provide signals indicative of the angular position of the disc. The disc bearing assembly carries a surface 27 which is normal to the translation axis and which is arranged to reflect through a window 28 in the wall 20 a laser beam 29 from an interferometer 30 so as to provide a measure of the position of the carriage along the translation axis. These arrangements are provided in order that the translation of the disc along the translation axis can be controlled in accord with the rotation of the disc. The disc itself is driven by a synchronous motor (not shown) housed in a sealed enclosure 31 below the carriage which is sealed from the vacuum chamber. The motor drives the disc at a constant speed which may be in the region of 1,500 revolutions per minute.

Signals from the interferometer 30 and the encoder 26 are compared (after division of the encoder's signals by a divider 32 in order, in accord with known practice, to match the frequencies of the compared signals) in a comparator 33; any error signal is amplified by an amplifier 34 and fed to the motor 24 to drive the lead screw.

The closed loop control system for controlling the translation of the disc could be replaced by an open loop system in which the lead screw is driven via gearing from the shaft driving the disc or from a second synchronous motor locked in frequency to the motor which provides rotation of the disc. An alternative possibility is to use an open loop system but to include the rotation encoder and the interferometer and to feed the error signal from the comparator to adjust by means of deflection plates the position of the electron probe to compensate for translational errors.

The thermoplastic film may be heated either by infrared or radio frequency heating. In order to avoid excessive heat dissipation, heating should be applied only to a small area of the thermoplastic film just before or just after that area comes underneath the electron probe. The order in which softening and charge deposition take place does not matter. Owing to the small separation of a final lens in an electron optical system for forming the probe and the face of the disc the heater cannot conveniently be located close to the electron probe. Accordingly the heater, denoted by the reference 35, is preferably located at the same diameter of the disc as is the electron probe but on the opposite side of the axis of the disc from the electron probe.

The thermoplastic film can be allowed to cool by thermal conduction into the disc.

Subsequent to recording and as a preliminary stage in the manufacture of disc records from the master recording, the disc may be inverted, rotated and translated in an inverted position while metal is evaporated from a boat which is preferably resistively heated. The disc should be rotated rapidly during this time in order to ensure an even coating of the evaporated metal on to the surface of the film. A solenoid operated shuttered aperture close to the surface of the film may be used to prevent excessive heating of the film by radiant energy from the boat and to avoid coating areas other than the surface of the film. Subsequently the metallised layer can be electroplated to form a self-supporting metal negative which can be used in making disc records. It may be necessary to spray the film with a release agent before it is metallised.

Figure 7:
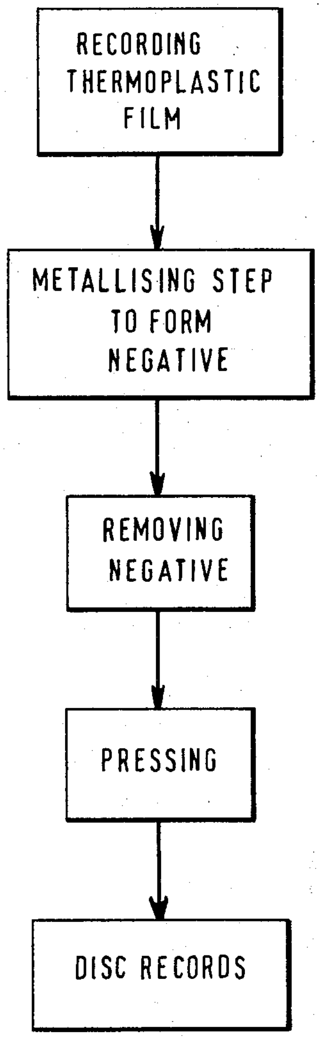
FIG. 7 is a flow chart illustrating the production of a disc record.

FIG. 7 summarizes the steps by which disc records are obtained.

Normally, as indicated hereinbefore, the vacuum near an electron gun generating the probe should be about $10^{-6}$ torr. If the recording medium is disposed in a separate chamber then the vacuum therein should be $10^{-4}$ torr or less.

However, it is not necessary for both the electron gun and the recording medium to be disposed in vacuum. In particular, the film itself can be disposed in air. In these circumstances the electron beam forming the probe would be directed through a window in an enclosure in which the electron gun is disposed. The enclosure itself would be evacuated. The window may be a thin window of titanium, aluminium or other suitable material. Provided that the film is disposed with its surface close to the window and the energy of the electron beam is sufficiently high, the beam is energetic enough by the time it strikes the thermoplastic film to permit recording in the manner hereinbefore set orth.

The signal recorded in the groove may also be played back after the initial metallising by taking advantage of the variation in secondary emission with varying inclination of an electron probe to the surface of the rippled groove in the thermoplastic film.

The carriage 15 and accordingly the disc an be tilted about the axis of translation so that the electron probe can be directed along and towards the groove but at an acute angle to the surface in which the groove is formed. Preferably this angle is about 45°. A collector which is shown schematically and denoted by the reference 36 faces towards the point of incidence of the electron beam on the recorded surface. In this embodiment the electron collector is provided with its axis horizontal and in a direction at right angles to the axis of translation of the carriage. The collector and the electron probe can be effectively fixed in position because in this embodiment the film and disc are moved in order to provided the necessary relative translation between the electron probe and the recorded groove.

The collector comprises a cylindrical metal cage with a shielding mesh towards the disc held at an appropriate voltage such as 200 volts positive. Associated with the collector is a scintillator disc of plastics material, onto which emitted secondary electrons are drawn through the collector mesh. The scintillator disc may be attached to an optical guide of "Perspex" (Registered Trade Mark) which carries light emitted by the scintillator disc to a glass window in the wall of the chamber. A photomultiplier or other photo electric transducer is disposed against the glass window and feeds a video amplifier which generates an output voltage signal.

This arrangement gives amplification of the secondary emitted circuit with a high signal to noise ratio which can be increased by increasing the electron current in the probe. As the probe is caused to scan along the groove the instantaneous rate of emission of secondary electrons will vary, thereby varying the rate at which secondary electrons are collected by the collector and the instantaneous amplitude of the light output of the scintillator disc.

Figure 5:
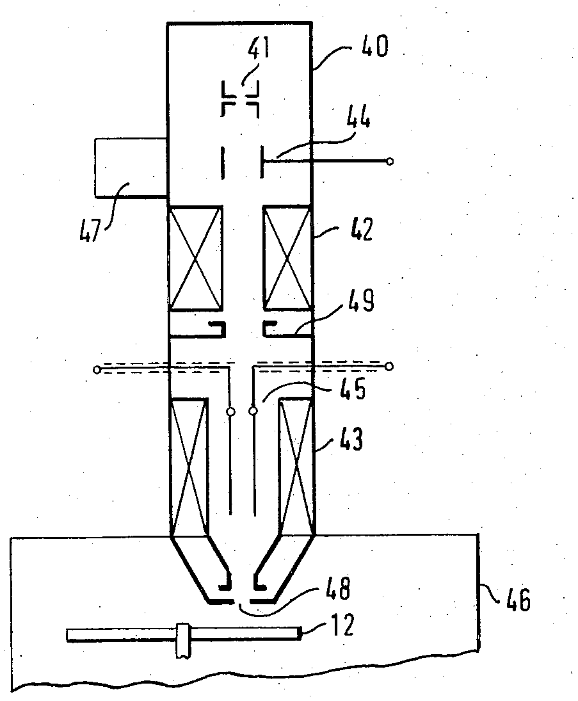
FIG. 5 illustrates an electron optical system.

FIG. 5 illustrates diagrammatically an electron optical system which may be used to form the electron probe. This apparatus consists of an electron gun 40 with a lanthanum hexaboride rod cathode 41, a first magnetic lens 42, a second magnetic lens 43, a pair of modulation plates 44, by which the intensity of the beam may be varied, a pair of deflecting plates 45 by which the focussed spot of the electron beam on the film can be wobbled, and a pair of blanking plates 49. FIG. 5 illustrates a subchamber 46 in which the disc 12 and its carriage may be disposed.

The required charge density in the electron probe would normally lie in the range from 1 to 10 amps/-square centimetre and in order to avoid excessive penetration of the thermoplastic film by the electrons, and consequent spreading of deposited charge, the energy of the electron beam should be about 5,000 electron volts when the depth of penetration of the thermoplastic film by the electrons is about 0.5 micron.

The optical system should be capable of wobbling the probe to produce a triangular groove in which signals of bandwidth up to 50 MHz can be recorded.

The electron optical system shown in FIG. 5 is, as far as the means for producing and focussing the beam are concerned, similar to that used in electron microscopes. The magnetic lenses are preferably cylindrically symmetrical.

It is necessary to provide a working vacuum of about $10^{-6}$ torr for long life. This may be effected by placing an ion pump 47 near the gun and a differential pumping aperture 48, which will also serve as an electron optical limiting aperture, between the column of the electron gun and the chamber containing the recording medium and its support.

The current in the electron probe may be modulated by deflection across the aperture formed by the plates 44. This manner of modulation of the current in the electron beam is known. The deflection voltage is linearly proportional to the current in the electron probe so that the signal to be recorded needs only amplification before it is applied across the deflection plates 44. Thus the deflection plates need only be simple parallel plates.

The wobbling of the focussed spot to produce an appropriate distribution of charge across the track and thereby to produce an appropriate profile of the groove may be produced by deflection of the electron beam by the plates 45 located in the back bore of the second lens 43. Here again simple parallel deflection plates can be used because the maximum deflection will be small compared with the limiting size of the aperture, although the plates 45 should be coaxial with the aperture.

In what follows it will be assumed that it is desired to record a television signal in the form of a frequency modulated carrier wave and that the recording is to be made in the form of a spiral groove.

The charge is deposited along a spiral track with a defined width. The spiral groove's cross section is required always to have the shape of an equilateral triangle with rounded vertices.

The information recorded in the groove, that is to say the television image and sound information is recorded as a frequency modulated signal. The process of recording converts the temporal frequency modulation of the signal to a spatial frequency modulation.

In order to produce a precisely defined groove shape, a precisely defined charge density distribution is required. As previously indicated, this distribution is produced by a focussed electron beam which is modulated in intensity (i.e. in current amplitude) and is also oscillated radially on the disc with a defined amplitude. At the same time, the disc's axis is translated steadily, and the disc is rotated steadily, both at defined rates, so that the central position of the oscillating electron beam describes the required spiral track.

The focussed electron beam has, probably, a Gaussian intensity distribution in any radial section and a constant intensity distribution along any circle concentric with its centre. It is conventional to define the diameter of the electron spot as the diameter for which the Gaussian intensity distribution is half its maximum height.

As the spot follows its spiral track along the thermoplastic surface, the radial oscillation or "spot wobble" ensures that the full possible groove width is covered with charge. The frequency of the oscillation with respect to the disc's surface velocity is preferably sufficient to ensure that charge is put down at every point of the groove. In the example quoted here, and assuming for convenience that all the spot charge is concentrated within the spot diameter (although according to the above definition of spot diameter there is actually charge outside this diameter), the frequency is preferably chosen so that charge is put down at each point twice. Thus the average intensity of the beam may be reduced.

The intensity of the beam (and thereby the spot) is modulated in synchronism with the spot wobble in order that the correct charge density should be deposited at each point of the groove to produce the defined groove shape.

The frequency modulated video information may be recorded by modulation with a modified form of itself the intensity of the beam. The signal actually used to modulate the beam differs from the information required to be derived from the recorded disc on playback in some ways. Those of particular interest here are related to the master recording process, and derive primarily from the following facts.

When a charge density is present on the softened thermoplastic surface, it produces, by its interaction with the electric field (produced mainly by the charge deposited and induced in the immediate neighbourhood of the point in question) a pressure which acts into the thermoplastic surface. This may be called the "electrostatic pressure". The electrostatic pressure, integrated over the whole thermoplastic surface, produces within the softened thermoplastic, a constant hydrostatic pressure, which balances the electrostatic pressure integrated over the whole thermoplastic surface. This hydrostatic pressure acts locally in opposition to the local electrostatic pressure to produce a local "excess pressure" which may be directed either into or out of the thermoplastic, depending upon the local predominance of one or the other of the electrostatic and hydrostatic pressures. This local excess pressure is, in turn, balanced locally by surface tension forces.

The equilibrium equation governing the balance between excess pressure P and surface tension, where the surface tension constant is $S_T$ and the radii of curvature in $x$ - $z$ planes and $y$ - $z$ planes (where $x$,$y$ and $z$ represent directions along, across and vertically through the groove respectively) are respectively $R_{xz}$ and $R_{yz}$, is $P = S_T(1/R_{xz} + 1/R_{yz})$. A radius of curvature is of positive sign if it is concave towards the excess pressure and of negative sign if convex.

This equation defines a relationship between, on the one hand, the excess pressure, hence the electrostatic pressure and hence the deposited charge density acting together with the electric field, and on the other hand, the *radius of curvature* of the surface. There is no direct relationship (other than that implied by these facts and the condition of mathematical continuity of the surface) between the charge density and the displacement of the surface in the $z$-direction.

As a consequence of the above facts, the signal used to modulate the intensity (i.e. current amplitude) of the electron spot must be such as to produce a charge density distribution which will ensure the following:

a. that the local charge density, interacting with the electric field produced by the neighbouring charge distribution, produces an electrostatic pressure of the required amplitude;

b. that this local electrostatic pressure amplitude, together with the integrated effect of the electrostatic pressure distribution over the whole thermoplastic surface in producing a hydrostatic pressure acting against it, produces an excess pressure of the required amplitude;

c. that this local excess pressure be such as to ensure the balancing of surface tension in the surface which is caused thereby to assume the required local radius of curvature;

d. that the surface equation, defined by the definition at every surface point of these local radii of curvature, should be that of the required surface.

These considerations of the relationship between deposited charge density and surface shape apply also, of course, to the charge distribution deposited in order to ensure the correct groove cross section as described above.

The signals defining the information to be recorded and the required cross section of the groove are introduced by modulating the intensity of the electron beam. These modulations are applied at the same or different points of the path of the electron beam between an electron source and the thermoplastic's surface. They are preferably applied at the same point, namely the plates 44 of the electron gun, and the modulating signals are electronically combined before application to the plates.

The functions describing the charge distribution in respect of the signal to be recorded and the groove's cross-section have been described above as though they were separable. Although at first sight it would appear that they would interact, because each will produce a component of electric field at a given point and each will have a component of charge at that point, the uniquely defined shape of the required surface is such that the two distribution functions, their two resulting electric field functions, the resulting pressures and the two finally resulting surface equations in the $x$ - $z$ and $y$ - $z$ planes at a point are, quite rigorously, mathematically separable.

Fairly complex mathematical calculations, which need not be repeated here, may be necessary to establish the required modulating functions for the beam in any particular case. The following results and preferences are given by way of example.

The choice for the beam diameter, $d$, is dictated by the shortest wavelength modulation that must be recorded on the polystyrene. This is 1.3 $\mu$, corresponding to a signal frequency of 6 MHz to be recorded on the inner grooves. To record 1.3$\mu$ a maximum beam diameter of 0.65$\mu$ is required. The beam diameter should be kept constant throughout the recording process since any attempt to adjust it might alter the beam current.

The effective tangential velocity of the disc, $V_T$, varies linearly with time during the recording process: thus an expression for the velocity is: $V_T = a + bt$. Hence the required variation of the spot-wobble frequency with time is: $f_{sw} = (a + bt)/d$. As previously indicated, the spot wobble frequency and its variation must be selected having regard to the effective tangential velocity and the beam diameter such that on each point that is scanned by the beam charge is deposited twice. The constants $a$ and $b$ are chosen accordingly. In a specific example, the dimensions of the disc require maximum and minimum tangential velocities of 15.7 m/s and 7.85 m/s. Thus the spot-wobble frequency is required to vary linearly from 24.2 MHz to 12.1 MHz.

During the time when the direction of movement of the beam is being reversed, the beam current must be cut off completely, by a blanking waveform in order to avoid excessive deposition of charge where the beam is practically stationary and thereby avoid the production of unwanted grooves at such places. This must have a frequency double that of the spot-wobble and a pulse time length which is a constant fraction of the spot-wobble period. The blanking waveform is applied to separate blanking plates 49 (FIG. 5).

The intensity of the beam may be controlled by a combination of three components. The first component contains the instantaneous frequency $f_s$ of the input video signal, and is a sine wave, frequency $f_s$, of amplitude $f_s^2/V_T$ and offset by $1/V_T$. The first component is thus a carrier wave of which the instantaneous frequency is frequency modulated by the information-bearing signal and of which the amplitude is modulated by the resultant of dividing a signal denoting the square of the instantaneous frequency by a signal denoting the effective tangential velocity. The second component is a sine-squared wave of frequency twice the spot-wobble frequency and amplitude $V_T$. The third component is a rectangular wave of fundamental frequence twice the spot-wobble frequency and amplitude $V_T$. The second and third components are incorporated in order to provide shaping of the sides and bottom of the groove, as discussed hereinbefore in relation to FIGS. 2 and 3 and as discussed in U.S. Pat. No. 3,737,589 granted to Redlich et al.

Figure 6:
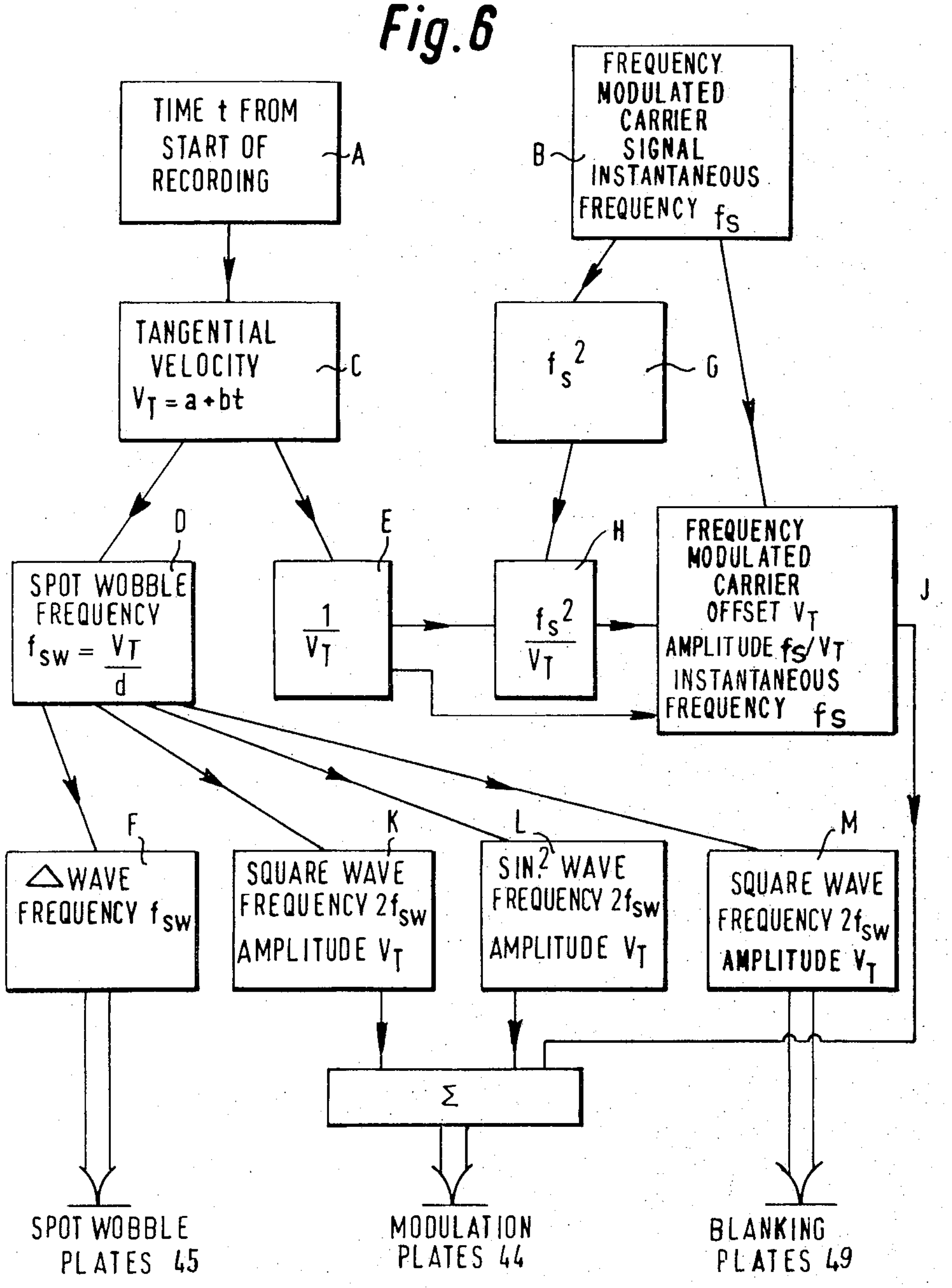
FIG. 6 is a flow chart illustrating the recording process.

The generation and application of the required waveforms is summarised in the flow chart, FIG. 6.

FIG. 6 shows the starting points of the recording process as a clock signal A denoting $t$, the time from the start of recording, and a frequency modulated signal carrier B of instantaneous frequency $f_s$. From signal A is developed signal C, denoting the tangential velocity $V_T$, whence is derived signal D, denoting the spot-wobble frequency and signal E denoting the reciprocal of the tangential velocity. Signal D is converted to signal F, the triangular voltage for the spot wobble plates 45 (FIG. 5). From signal B is developed signal G, a squared version of the instantaneous frequency $f_2$ of signal B. A division of signal G by signal E yields signal H. This signal governs the amplitude of signal J, which is the carrier signal of which the frequency $f_s$ is modulated by the information - bearing signal. Signal J is offset by signals E. From signal D are derived signals K, L and M respectively, a 'square' wave of frequency $2f_{sw}$ and amplitude $V_T$, a sine-squared wave of frequency $2f_{sw}$ and amplitude $V_T$ and a 'square' wave of frequency $2f_{sw}$ and amplitude sufficient to inhibit the electron beam.

Signals K, L and J are combined and fed to the modulating plates 44 (FIG. 5). Signal M is fed to the blanking plates 49. It will be readily appreciated that the actual development and conversion of signals described by FIG. 6 can be performed using electronic techniques well known in themselves.

We claim:

1. In a method of recording an information bearing signal in the form of a contoured groove in the surface of a thermoplastic film, which method includes the steps of supporting the film on a conductive substrate, directing a focused and modulated beam of electrons at the said surface to deposit a track of charge thereon, rotating the film in its own plane and simultaneously translating the film so that the track follows a spiral path and heating the film to soften it so that subsequent to the deposition of charge the surface assumes a contoured representation of the modulations of the beam of electrons; the improvement which comprises the steps of:

a. developing a frequency-modulated signal carrying the information bearing signal;

b. developing a spot wobble signal at a wobble frequency which varies as the effective tangential velocity of the film where the beam strikes it whereby substantially every point scanned by the beam is doubly charged;

c. developing groove shaping signals at twice said wobble frequency, and at an amplitude which varies as the said effective tangential velocity;

d. developing a beam blanking signal at twice said wobble frequency;

e. oscillating said beam from side to side across the path of the spiral in response to the spot wobble signal;

f. blanking the beam, at the extremities of its side to side movement, in response to the beam blanking signal;

g. combining the frequency-modulated signal and the said groove shaping signals; and, h. modulating the intensity of the beam in response to the combined frequency-modulated signal and groove shaping signals.

2. The invention of claim 1 wherein said step of developing a spot wobble signal comprises:

developing a signal proportional to said effective tangential velocity divided by the diameter of said beam; and developing from the last-named signal a triangular wave spot wobble signal.

3. The invention of claim 2 further comprising:

modulating the amplitude of the frequency modulated signal in proportion to the square of the instantaneous frequency of the frequency and in inverse proportion to the said effective tangential velocity; and offsetting said frequency modulated signal in inverse proportion to the said effective tangential velocity.

4. In an apparatus for recording an information bearing signal in the form of a contoured groove in the surface of a thermoplastic film, which apparatus includes means for supporting the film on a conductive substrate, means for directing a focused and modulated beam of electrons at the said surface to deposite a track of charge thereon, means for rotating the film in its own plane and simultaneously translating the film so that the track follows a spiral path and means for heating the film to soften it so that subsequent to the deposition of charge the surface assumes a contoured representation of the modulations of the beam of electrons; the improvement which comprises:

a. means for developing a frequency-modulated signal carrying the information bearing signal;

b. means for developing a spot wobble signal at a wobble frequency which varies as the effective tangential velocity of the film where the beams strikes it whereby substantially every point scanned by the beam is doubly charged;

c. means for developing groove shaping signals at twice said wobble frequency, and at an amplitude which varies as the said effective tangential velocity;

d. means for developing a beam blanking signal at twice said wobble frequency;

e. means for oscillating said beam from side to side across the path of the spiral in response to the spot wobble signal;

f. means for blanking the beam, at the extremities of its side to side movement, in response to the beam blanking signal;

g. means for combining the frequency-modulated signal and the said groove shaping signals; and, h. means for modulating the intensity of the beam in response to the combined frequency-modulated signal and groove shaping signals.

5. The invention of claim 4 wherein said means for developing a spot wobble signal comprises:

means for developing a signal proportional to said effective tangential velocity divided by the diameter of said beam; and means for developing from the last-named signal a triangular wave spot wobble signal.

6. The invention of claim 5 further comprising:

means for modulating the amplitude of the frequency modulated signal in proportion to the square of the instantaneous frequency of the frequency and in inverse proportion to the said effective tangential velocity; and means for offsetting said frequency modulated signal in inverse proportion to the said effective tangential velocity.

* * * * *

UNITED STATES PATENT OFFICE
CERTIFICATE OF CORRECTION

Patent No. 3,821,488 Dated June 28, 1974

Inventor(s) Graham Stuart Plows and Gordon Malcolm Edge

It is certified that error appears in the above-identified patent and that said Letters Patent are hereby corrected as shown below:

In the Heading of the Patent the name of the Assignee "Decco Limited" should read --Decca Limited--.

Signed and sealed this 29th day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.